(12) United States Patent
Yamakita

(10) Patent No.: US 10,361,028 B2
(45) Date of Patent: Jul. 23, 2019

(54) METHOD FOR MANUFACTURING WOUND COIL

(71) Applicant: MURATA MANUFACTURING CO., LTD., Kyoto-fu (JP)

(72) Inventor: Takayuki Yamakita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 395 days.

(21) Appl. No.: 15/165,528

(22) Filed: May 26, 2016

(65) Prior Publication Data

US 2016/0358710 A1    Dec. 8, 2016

(30) Foreign Application Priority Data

Jun. 2, 2015   (JP) .................. 2015-112306

(51) Int. Cl.
*B29C 39/10* (2006.01)
*B29L 31/00* (2006.01)
(Continued)

(52) U.S. Cl.
CPC ........... *H01F 41/127* (2013.01); *B29C 39/10* (2013.01); *H01F 17/045* (2013.01); *H01F 27/292* (2013.01); *H01F 27/327* (2013.01); *B29K 2105/0005* (2013.01); *B29K 2105/0058* (2013.01); *B29K 2105/16* (2013.01);
(Continued)

(58) Field of Classification Search
CPC .... H01F 41/127; H01F 41/005; H01F 17/045; H01F 27/292; H01F 27/327; B29C 39/10; B29C 70/682; B29K 2105/0005; B29K 2105/0058; B29K 2105/16;
(Continued)

(56) References Cited

U.S. PATENT DOCUMENTS

2004/0021541 A1*  2/2004  Otsuka .................. H01F 17/045
                                          336/175

FOREIGN PATENT DOCUMENTS

CN       1168103 C       9/2004
CN       101441930 A     5/2009
(Continued)

OTHER PUBLICATIONS

Machine translation obtained Jan. 6, 2018, orginial document: Sasaki, Yoshinori; JP-2003100542-A; published Jun. 2003 (Year: 2003).*

(Continued)

*Primary Examiner* — Robert J Grun
*Assistant Examiner* — Michael Robinson
(74) *Attorney, Agent, or Firm* — Studebaker & Brackett PC

(57) ABSTRACT

A method for manufacturing a wound coil which has a stable appearance configuration with improved shape accuracy of a coating resin formed on the wound coil. A wound coil element is pressed into a holding jig including an elastic holding hole, and held therein such that an upper end of a coil is level with or lower than an upper end of the holding hole, and a gap G is present between an inner surface of the holding hole and the coil. Next, a flowable coating resin is supplied into the holding hole holding the wound coil element such that the coating resin is held without flowing away downwardly from the gap G, and the upper end 16a of the coil is buried in the coating resin. Next, the supplied coating resin is subjected to curing, thereby forming a wound coil.

8 Claims, 14 Drawing Sheets

(51) Int. Cl.
- *B29L 31/34* (2006.01)
- *H01F 17/04* (2006.01)
- *H01F 27/29* (2006.01)
- *H01F 27/32* (2006.01)
- *H01F 41/12* (2006.01)
- *B29K 105/00* (2006.01)
- *B29K 105/16* (2006.01)
- *B29K 105/20* (2006.01)

(52) U.S. Cl.
CPC .. *B29K 2105/20* (2013.01); *B29K 2995/0005* (2013.01); *B29K 2995/0008* (2013.01); *B29L 2031/3406* (2013.01); *B29L 2031/711* (2013.01)

(58) Field of Classification Search
CPC ........ B29K 2105/20; B29K 2995/0005; B29K 2995/0008; B29L 2031/3406; B29L 2031/711
See application file for complete search history.

(56) References Cited

FOREIGN PATENT DOCUMENTS

| | | | |
|---|---|---|---|
| JP | S59-152714 U | 10/1984 | |
| JP | H01-150304 A | 6/1989 | |
| JP | 2000-286140 A | 10/2000 | |
| JP | 2001-155937 A | 6/2001 | |
| JP | 2003-100542 A | 4/2003 | |
| JP | 2003-272927 A | 9/2003 | |
| JP | 2007-220758 A | 8/2007 | |

OTHER PUBLICATIONS

An Office Action; "Notice of Reasons for Rejection," issued by the Japanese Patent Office dated Nov. 30, 2017, which corresponds to Japanese Patent Application No. 2015-112306 and is related to U.S. Appl. No. 15/165,528.

Notification of the First Office Action issued by the State Intellectual Property Office of the People's Republic of China dated Oct. 11, 2017, which corresponds to Chinese Patent Application No. 201610364304.5 and is related to U.S. Appl. No. 15/165,528.

An Office Action mailed by Chinese Patent Office dated Jul. 23, 2018, which corresponds to Chinese Patent Application No. 201610364304.5 and is related to U.S. Appl. No. 15/165,528.

\* cited by examiner

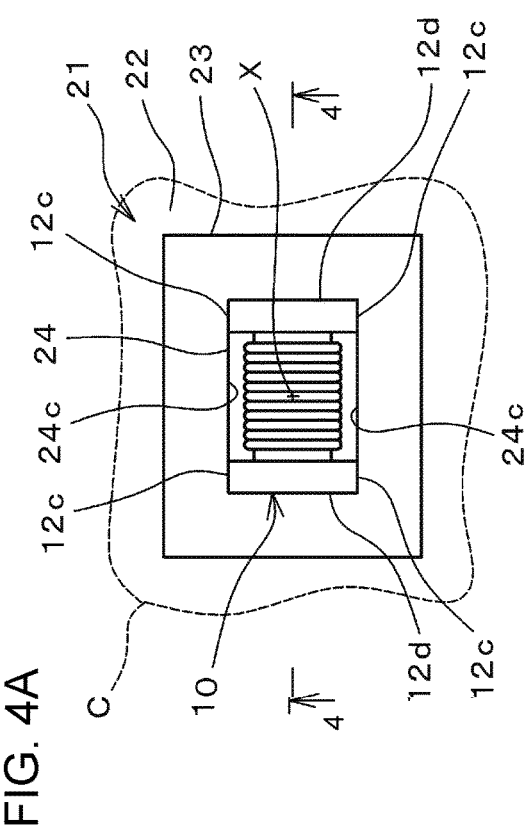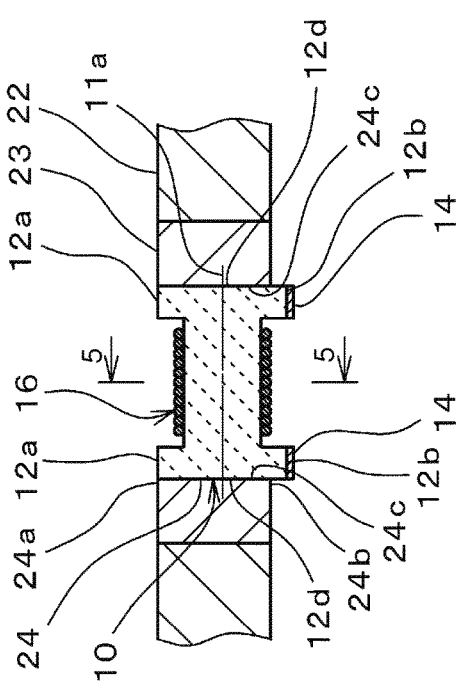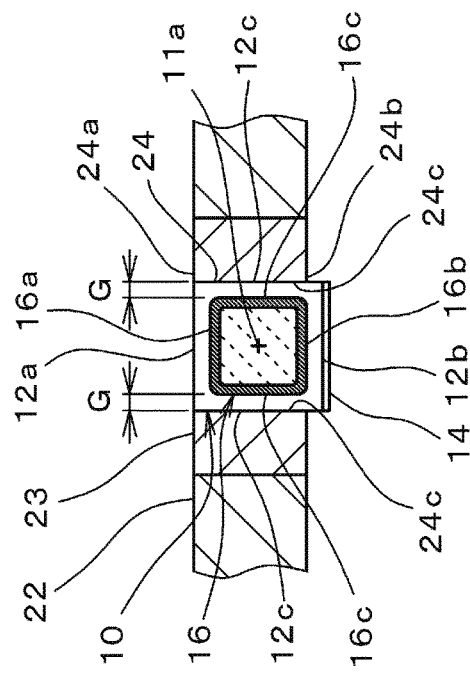

METHOD FOR MANUFACTURING WOUND COIL

CROSS REFERENCE TO RELATED APPLICATIONS

This application claims benefit of priority to Japanese Patent Application 2015-112306 filed Jun. 2, 2015, the entire content of which is incorporated herein by reference.

TECHNICAL FIELD

The present disclosure relates to a method for manufacturing a wound coil, and more particularly, to a method for manufacturing a wound coil provided with a coating resin so as to cover a coil wound around a winding core.

BACKGROUND

Typical wound coil elements include an element where a wire is wound around a winding core of a core including the winding core and a pair of flanges provided at both ends of the winding core, and a beginning and an end of the wire are connected to terminal electrodes provided on the flanges. In addition, such wound coils include a wound coil provided with a coating resin so as to cover a wire wound around a winding core.

Further, Japanese Patent Application Laid-Open No. 2000-286140 discloses, as shown in FIG. 13, a wound coil 101 including a core 113 that has a winding core 111 and a pair of flanges 112 provided at both ends of the winding core 111; and a wire 115 wound around the winding core 111, where a coating resin 117 is provided so as to cover the entire perimeter of the wire 115 wound around the winding core 111.

Further, in accordance with a method for manufacturing a wound coil according to Japanese Patent Application Laid-Open No. 2000-286140, as shown in FIG. 14, the coating resin 117 is applied around the wire 115, and with the resin dried in contact with a finger (dried such that no paint adheres to a fingertip when a center of the coated surface is touched with a finger), a wound coil element 110 is then pressed into a component housing part 124 composed of an elastic body of heat-resistant rubber, and heated to form the coating resin 117 into a shape corresponding to the shape of the component housing part 124.

It is to be noted that the flanges 112 are provided with four relief parts 118 such that the coating resin 117 protruded around the winding core 111 can be relieved when the coating resin 117 is shaped, and the shaping is adaptively carried out with the coating resin 117 retained in the relief parts 118.

However, in accordance with the method in Japanese Patent Application Laid-Open No. 2000-286140, the wound coil element 110 is pressed into the component housing part 124 with the coating resin 17 dried in contact with a finger, and there is thus a problem that the shape of the coating resin 117 is lost by the elastic force of the component housing part 124, thereby failing to form the resin into a desired shape.

In addition, the shape of the coating resin 117 retained in the relief parts 118 of the flanges 112 may vary depending on the multiple relief parts 118, and there is a problem that the appearance configuration is not stable (i.e., not consistent).

SUMMARY

The present disclosure is intended to solve the problems mentioned above, and an object of the disclosure is to provide a method for manufacturing a wound coil, which is capable of efficiently manufacturing a wound coil which has a stable appearance configuration (i.e., consistent appearance) with improved shape accuracy of a coating resin formed on the wound coil.

In order to solve the problems mentioned above, a method for manufacturing a wound coil according to the present disclosure is a method for manufacturing a wound coil including: a wound coil element including a core having a winding core and a pair of flanges provided at both ends of the winding core, terminal electrodes provided on the pair of flanges, and a wire wound around the winding core to constitute a coil, with a beginning and an end of the wire connected to the terminal electrodes; and a coating resin provided to bury the coil from an upper portion to both side portions of the winding core, the method is characterized in that it includes the steps of:

pressing the wound coil element in a holding hole of a holding jig, the holding hole having an inner surface made of an elastic material, and holding the wound coil element such that an upper end of the coil is level with or lower than an upper end of the holding hole, and a gap is present between the inner surface of the holding hole and the coil;

supplying the coating resin with fluidity into the holding hole holding the wound coil element such that the coating resin is held in the gap between the inner surface of the holding hole and the coil without causing the coating resin to flow away downwardly from the gap, and the coil is buried from the upper portion to both side portions of the winding core; and curing the supplied coating resin, with the wound coil element held in the holding jig.

It is to be noted that in the present disclosure, the attitude of the holding jig in supplying the coating resin is not limited to attitude cases where the principal surface of the jig is horizontal, whereas the axial direction of the holding hole is a vertical direction, but the disclosure is intended to encompass cases of supplying the coating resin, for example, in an attitude where the principal surface of the holding jig is sloped with respect to the horizontal direction (an attitude where the axial direction of the holding hole makes an angle with respect to the vertical direction).

It is to be noted that the same applies to the attitude of the holding jig in supplying the coating resin, also in the case of the configurations according to the present disclosure.

In addition, the step of supplying the coating resin includes supplying the coating resin up to a level above the upper end of the holding hole, and the step of curing the supplied coating resin is carried out after removing the coating resin present above the level of the holding hole.

In the case of supplying the coating resin up to a level above the upper end of the holding hole, removing the coating resin present above the level of the holding hole, and then curing the coating resin, it is possible to efficiently manufacture a wound coil provided with the coating resin on the upper surfaces and side surfaces of the coil.

In addition, it is possible to form the shape of the coating resin by curing so as to correspond to the shape of the holding hole provided in the holding jig, thereby making it possible to provide a wound coil which is less likely to vary in size.

In addition, the method preferably further includes a step of removing, after the step of curing the coating resin, the cured coating resin present above the upper end of the holding hole, when the cured coating resin is present above the upper end of the holding hole.

When the above-mentioned configuration is adopted, it is possible to further reliably achieve an electronic component with high dimensional accuracy, and it is possible to remove foreign substances such as unnecessary cured resin from the upper surface (including the region without any holding hole formed) of the holding jig and to prepare the holding jig for the next use, thereby making it possible to improve the productivity.

In addition, the step of supplying the coating resin includes disposing a mask having an opening corresponding to the holding hole so as to cover the holding jig, and supplying the coating resin through the opening of the mask.

The configuration mentioned above can suppress the adhesion of the coating resin to the upper surface of the holding jig, thereby reducing the burden required for cleaning the holding jig.

In addition, the holding hole is preferably rectangular in shape as viewed from an axial direction of the holding hole.

When the holding hole is rectangular in shape as viewed from the axial direction, it is possible to reliably hold the flanges of the wound coil element in the holding hole, thereby making it possible to improve the productivity.

In addition, the wound coil element may be held such that a gap is provided between the inner surface of the holding hole and a side surface of each of the flanges, by using a holding jig with the holding hole for elastically holding outer end surfaces of the flanges of the core, the outer end surfaces being opposed to each other.

The adoption of the configuration as described above makes it possible to increase the thickness of the coating resin covering the coil.

In addition, it is also possible for the method to be configured in such way that the wound coil element is held such that a gap is provided between the inner surface of the holding hole and a part of a side surface of each of the flanges, by using a holding jig with the holding hole for elastically holding outer end surfaces of the flanges of the core, the outer end surfaces of the flanges of the core being opposed to each other, and elastically holding regions that are the part of the side surface of each of the flanges located near the outer end surfaces of the flanges of the core.

Even when the configuration is adopted as described above, it is possible to increase the thickness of the coating resin covering the coil.

In addition, the wound coil element is held in the holding hole such that upper ends of the flanges are lower in level than the upper end of the holding hole, and the coating resin is supplied up to a level above the upper ends of the flanges in the step of supplying the coating resin.

When the configuration is adopted as described above, it is possible to increase the thickness of the coating resin covering the upper end of the coil.

The method for manufacturing a wound coil according to the present disclosure is configured to supply the flowable coating resin into the holding hole holding the wound coil element such that the coating resin is held in the gap between the inner surface of the holding hole and the coil without causing the coating resin to flow away downwardly from the gap, and the upper end of the coil is buried in the coating resin, and cure the resin, thus providing a wound coil including the coating resin corresponding to the shape of the holding hole, and making it possible to efficiently manufacture a wound coil which has excellent shape accuracy as a whole including the coating resin, and having a favorable appearance.

In addition, when, for example, a resin material containing a magnetic powder is used as a material for the coating resin, it is possible to manufacture a wound coil which is excellent in terms of electrical characteristics such as magnetic flux shielding performance and inductance acquisition efficiency, and less likely to vary in electrical characteristics.

In addition, the need to adopt the structure where flanges are provided with relief parts as in the prior art is eliminated, thereby making it possible to simplify the core shape.

It is to be noted that, in the present disclosure, the aspect of the coating resin held in the gap between the inner surface of the holding hole and the coil without causing the coating resin to flow away downwardly from the gap can be achieved by appropriately selecting the viscosity and surface tension of the coating resin before being subjected to curing, the size of the gap between the inner surface of the holding hole and the coil, the relationship between the geometry of the coil formed by the wire wound around the winding core and the geometry of the inner surface, the property (the degree of repelling the coating resin) of the inner surface, and the like.

BRIEF DESCRIPTION OF THE DRAWINGS

FIGS. 4A, 4B, and 4C are diagrams illustrating a wound coil element held by a holding jig, which are a plan view of a part C in FIG. 3, a schematic cross-sectional view along the line 4-4, and a schematic cross-sectional view along the line 5-5, respectively.

DETAILED DESCRIPTION

Figure 1A:
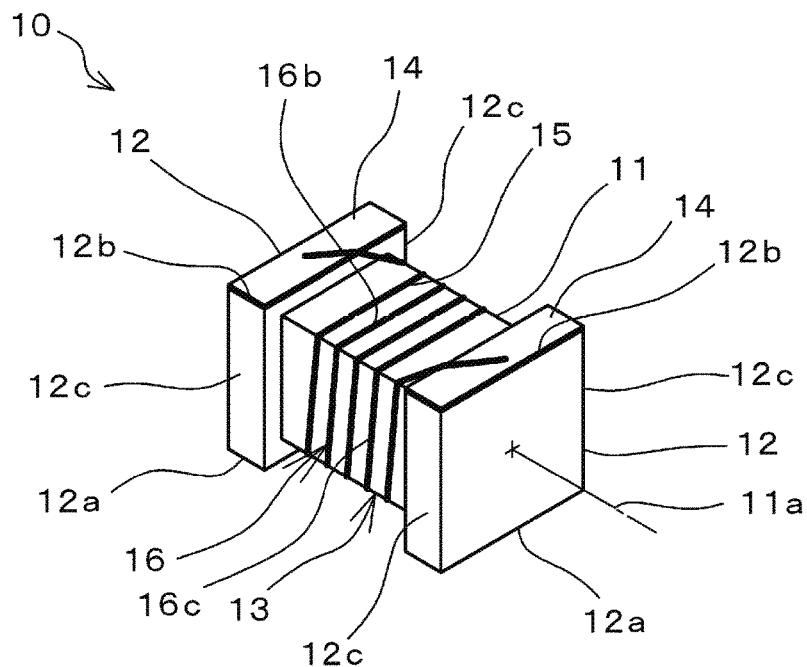
FIGS. 1A and 1B are perspective views for explaining a wound coil, which illustrate a wound coil (wound coil element) before being coated with a coating resin and a wound coil obtained by coating the wound coil element with a coating resin, respectively.

Features of the present disclosure will be described in more detail below with reference to an embodiment of the present disclosure.

First, a wound coil that is prepared by a method for manufacturing a wound coil according to the present disclosure will be described with reference to FIGS. 1A and 1B and FIGS. 2A to 2C. It is to be noted that FIGS. 1A and 1B show a wound coil element 10 and a wound coil 1 where lower surfaces 12b of flanges 12 provided with terminal electrodes 14 are faced up.

The wound coil element 10 includes, as shown in FIG. 1A, a core 13 including: a winding core 11 that is rectangular in cross-sectional shape in a direction perpendicular to a winding axis 11a; and a pair of flanges 12 provided at both ends of the winding core 11, which is rectangular in shape as viewed in the axial direction of the winding axis 11a. The terminal electrodes 14 are formed on the lower surfaces 12b of the flanges 12, which serve as surfaces opposed to an object (e.g., a circuit board) on which the wound coil 1 is to be mounted. Further, a wire 15 is wound around the winding core 11 to constitute a coil 16, and a beginning and an end of the wire 15 are respectively connected to the different terminal electrodes of the pair of terminal electrodes 14.

Figure 1B:
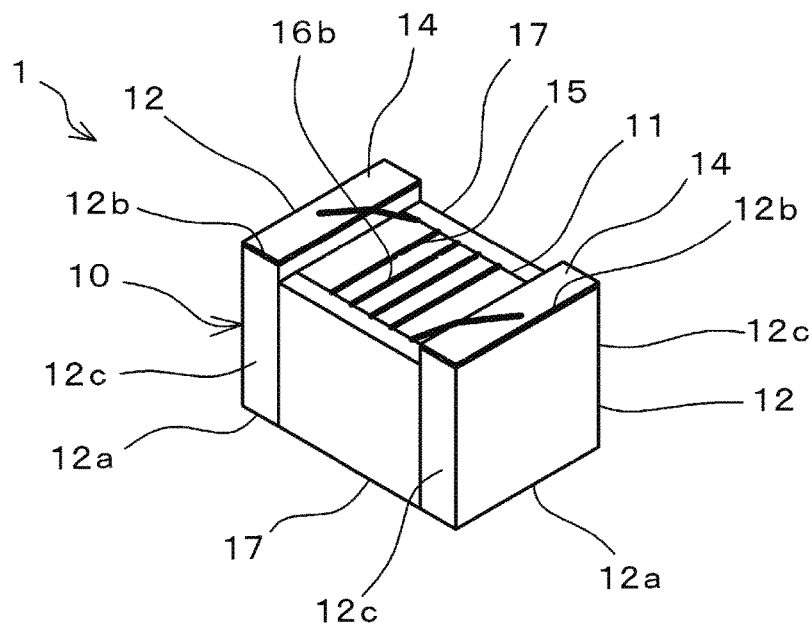
Figure 2A:
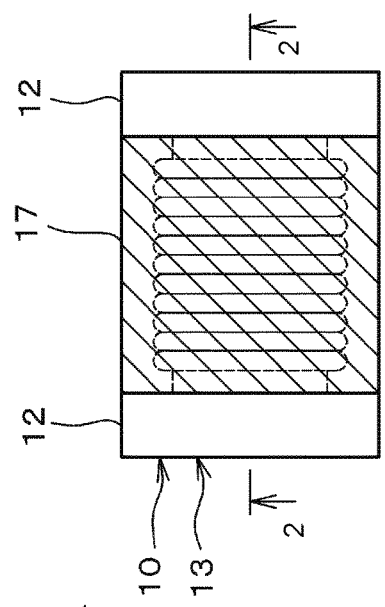
FIGS. 2A, 2B, and 2C are diagrams illustrating the wound coil shown in FIG. 1B, which are a plan view, a schematic cross-sectional view along the line 2-2, and a schematic cross-sectional view along the line 3-3, respectively.
Figure 2C:
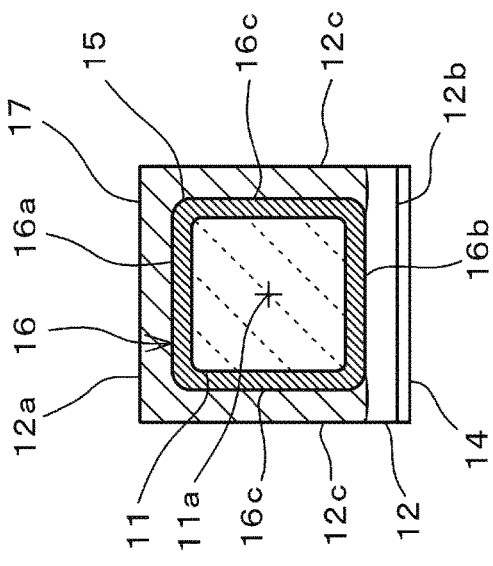
Figure 2B:
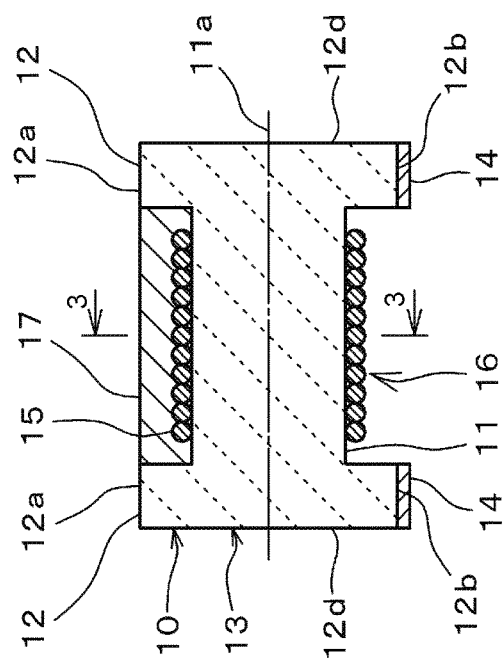
Figure 3:
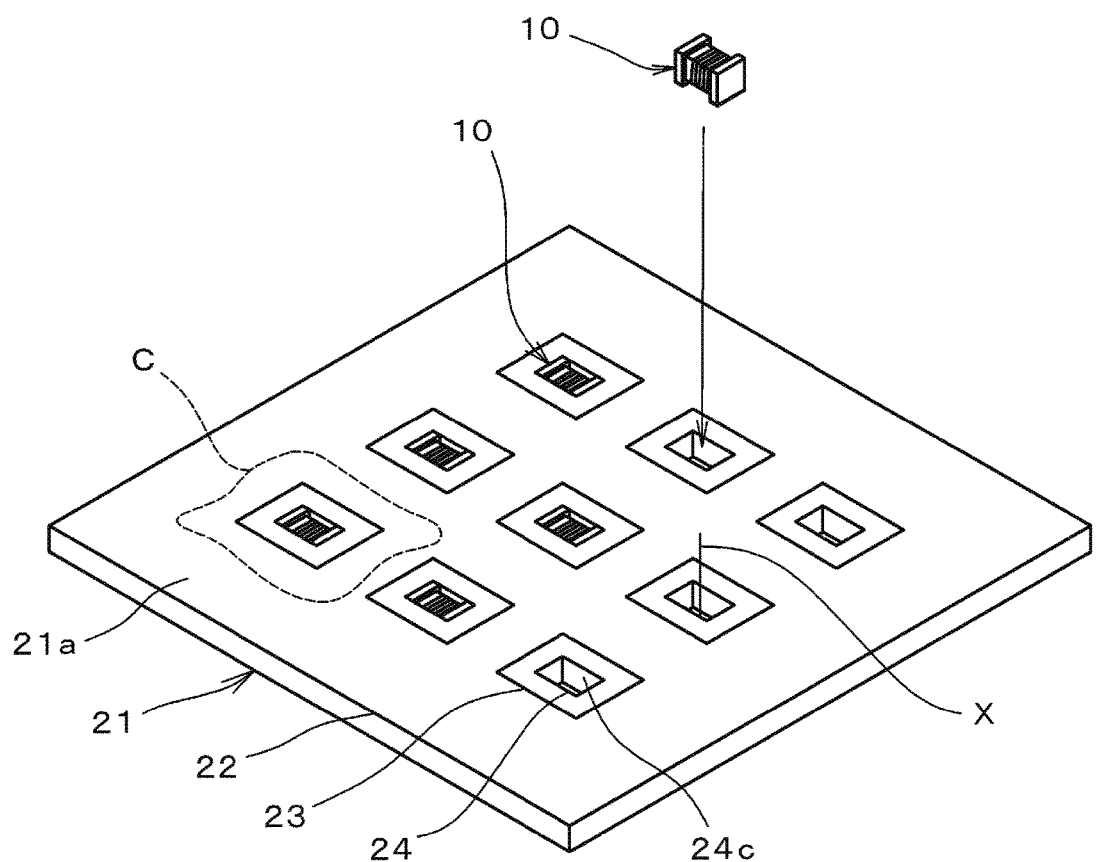
FIG. 3 is a perspective view of a holding jig for holding a wound coil element.

Further, the wound coil 1 includes, as shown in FIG. 1B and FIG. 2, a coating resin 17 that coats a main part of the coil 16 (a region excluding the region opposed to an object on which the coil 16 is to be mounted). More specifically, the coating resin 17 is provided in such a way as to coat, of the coil 16 composed of the wire 15 wound around the winding core 11, an upper portion (upper end) 16a that is a region corresponding to an upper surface of the winding core 11, and a pair of side portions (side ends) 16c that are regions corresponding to both side portions (both side surfaces) of the winding core 11, but not to coat a lower part (lower end) 16b that is a region corresponding to a lower surface of the winding core 11.

Next, a method for manufacturing a wound coil according to an embodiment of the present disclosure will be described.

(1) First, a holding jig 21 is prepared as shown in FIGS. 3 and 4A to 4C. The holding jig 21 includes a jig body 22 of a rigid material, and a number of holding holes 24 for elastically holding wound coil elements 1, with inner surfaces 24c of an elastic material, and an axial direction X perpendicular to a principal surface 21a of the holding jig 21.

The holding holes 24 are provided respectively so as to pass through a number of elastic members 23 recessed in a matrix form in the jig body 22, and the planar shape (the shape of the holding hole 24 as viewed from the axial direction X) is made rectangular.

It is to be noted that a silicone rubber that has heat resistance is used as the elastic material constituting the inner surfaces 24c of the holding holes 24.

(2) Next, wound coil elements 10 are pressed into the holding holes 24 of the holding jig 21. The pressed wound coil element 10 is elastically held by the elastic force of the elastic material constituting the inner surface 24c, with outer end surfaces 12d and both side surfaces 12c of the flanges 12 in abutment with the inner surface 24c of the holding hole 24 (see FIG. 4A).

In this regard, the holding jig 21 is provided on a stage (not shown) such that the axial direction X of the holding hole 24 is vertically oriented, and the pressed wound coil element 10 is held such that the surfaces of the flanges 12 with the terminal electrodes 14 formed are located as lower surfaces.

Further, the wound coil element 10 is configured to be held with the upper end (upper portion) 16a of the coil 16 equivalent to or lower than an upper end 24a of the holding hole 24, and held in such a way that gaps G are formed between both side ends (both side portions) 16c of the coil 16 and the inner surface 24c of the holding hole 24 (see FIG. 4C).

It is to be noted that the gaps G are made, for example, 0.05 mm or more and 0.2 mm or less in this embodiment.

In addition, in this embodiment, the wound coil element 10 is held such that the lower end 16b of the coil 16 wound around the winding core 11 is level with a lower end 24b of the holding hole 24.

For example, when a design is created such that the distance from the upper end (the upper surface in this embodiment) 12a of the flange 12 to the lower end 16b of the coil 16 is equal to the distance from the upper end 24a of the holding hole 24 to the lower end 24b thereof, the upper end (upper surface) 12a of the flange 12 is located to be aligned with the upper end 24a of the holding hole 24, thereby making it possible to hold the element such that the lower end 16b of the coil 16 is level with the lower end 24b of the holding hole 24, and the level of the wound coil element 10 held can be easily adjusted, which is preferable.

Figure 5A:
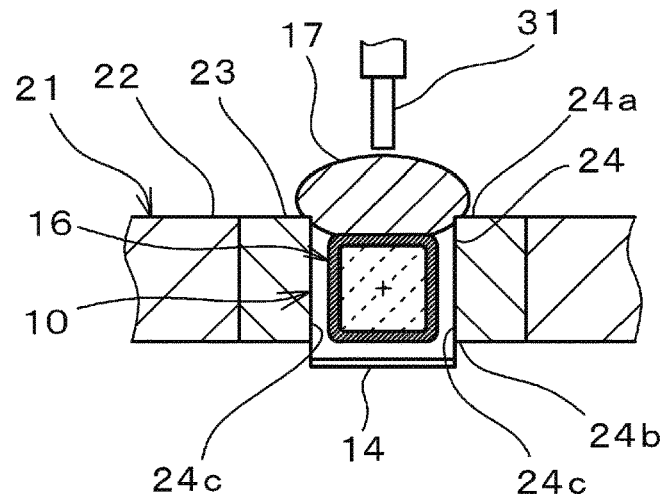
FIGS. 5A, 5B, and 5C are diagrams illustrating a coating resin supplied to a wound coil element, which are diagrams illustrating just after supplying the coating resin above a winding core, filling, with the coating resin, the gap between the inner surface of a holding hole of the holding jig and a coil, and removing the coating resin present above the level of the upper end of the holding hole, respectively.

(3) Next, as shown in FIG. 5A, the flowable coating resin 17 is supplied onto the holding hole 24 holding the wound coil element 10. The coating resin 17 is supplied up to a higher level than the upper end 24a of the holding hole 24, with the use of a resin supply device (for example, dispenser) 31.

It is to be noted that a magnetic powder-containing resin with Fe powder (60 to 80 weight %) dispersed in an epoxy resin as a thermosetting resin is used as the coating resin 17 in this embodiment.

The viscosity of the magnetic powder-containing resin is, for example, 10 Pa·s or more and 90 Pa·s or less.

Figure 5B:
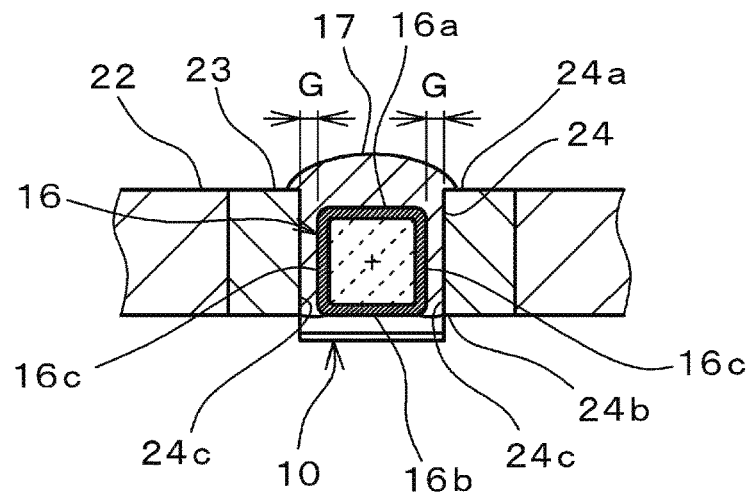

The coating resin 17 supplied onto the holding hole 24 moves, as shown in FIG. 5B, downwardly along the gaps G between the inner surface 24c of the holding hole 24 and the coil 16 by its own weight and capillary action. The moving coating resin 17 is held in the gaps G by surface tension, and never flows away downwardly from the gaps G. In this embodiment, the side portions (side surfaces) of the coil 16 wound around the winding core 11 that is rectangular in cross-sectional shape are parallel to the inner surface 24c of the holding hole 24, and the coating resin 17 is thus held in a position that is roughly level with the lower ends of the side portions (side ends) 16c of the coil 16 or the lower end 24b of the holding hole 24, as lower ends of the regions where the inner surface 24c of the holding hole 24 is opposed to the side surface of the coil 16.

Figure 5C:
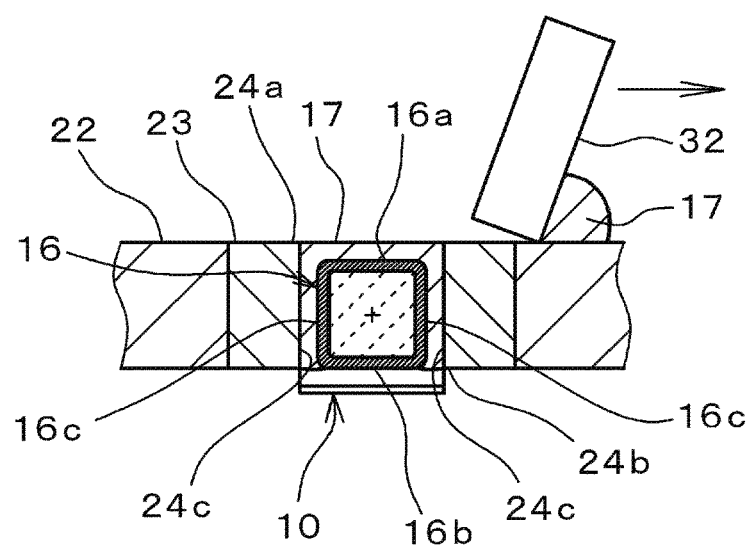

(4) Then, as shown in FIG. 5(c), the coating resin 17 present above the level of the upper end 24a of the holding hole 24 of the holding jig 21 is removed with an elastic squeegee 32.

(5) Next, the wound coil elements 10 are put along with the holding jig 21 in an oven (not shown) at 100° C. to 150° C., for thermally curing the coating resin 17.

Thereafter, the wound coil elements 10 are taken out from the holding jig 21, thereby providing the wound coil 1 which has a structure where the upper portion (upper end) 16a and both side portions (both side ends) 16c of the coil 16 are coated with the coating resin 17, whereas the lower part (lower end) 16b thereof is not coated with the coating resin 17, as shown in FIG. 1B and FIGS. 2A to 2C.

Figure 6:
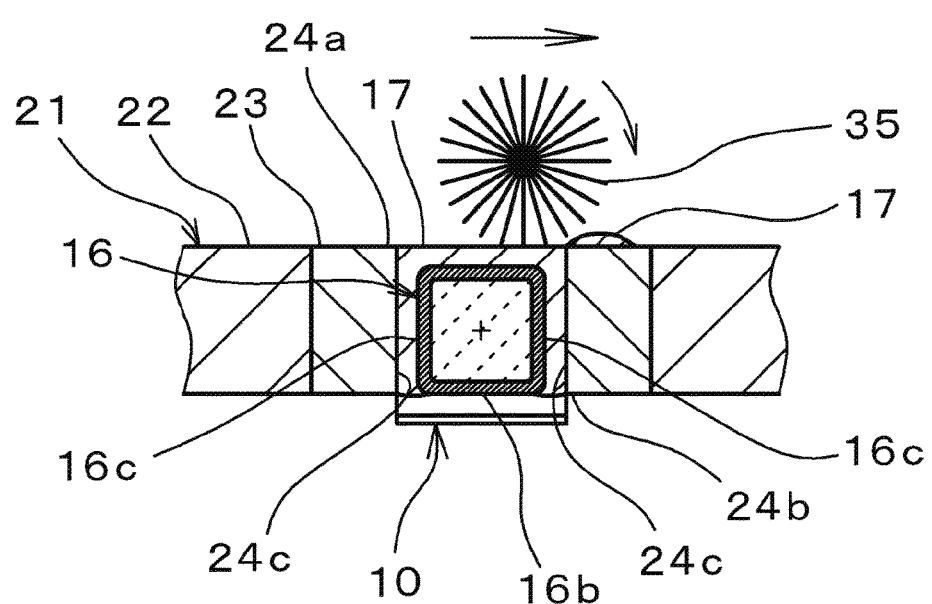
FIG. 6 is a diagram illustrating the removal of a cured coating resin present above the level of a holding hole of a holding jig.

It is to be noted that when the coating resin (excess cured resin) 17 is left above the level of the surface of the holding jig 21 (the upper end 24a of the holding hole 24) after the thermal curing as shown in FIG. 6, it is also possible to remove the coating resin 17 by a cured resin removal device (e.g., a cleaning brush) 35.

In such a case, at the same time, the effect of being able to remove a burr of the cured resin, which is formed around the upper end of the holding hole 24, is achieved.

Figure 7A:
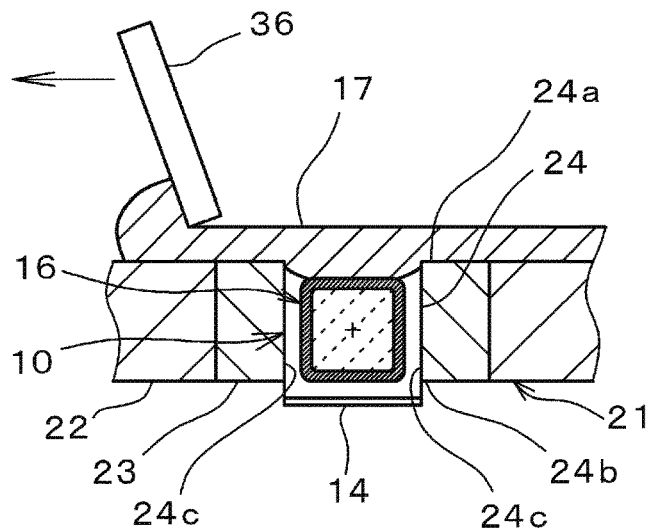
FIGS. 7A to 7C are diagrams illustrating another method in the case of supplying a coating resin to a wound coil element.

In addition, in the case of supplying the coating resin 17, it is also possible to cause the coating resin 17 to be efficiently supplied into the holding hole 24 in such a way that an excessive amount of coating resin 17 is supplied to the upper surface of the holding jig 21, and the excess is then scraped with the use of a scraper 36 provided above the holding jig 21 so that the required amount is left on the holding jig 21 as shown in FIG. 7A.

Figure 7B:
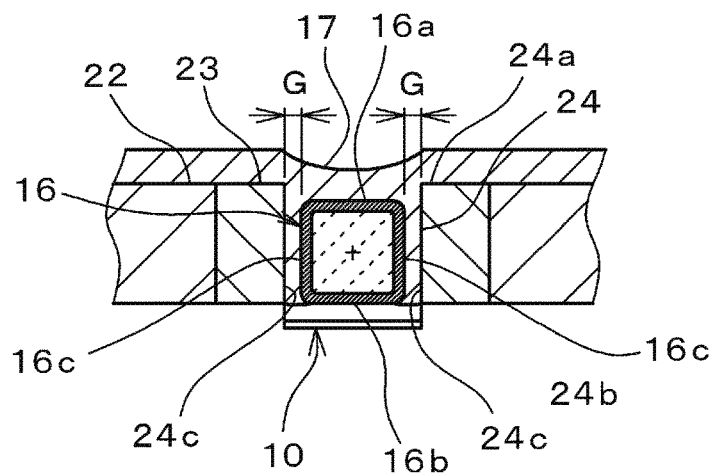
Figure 7C:
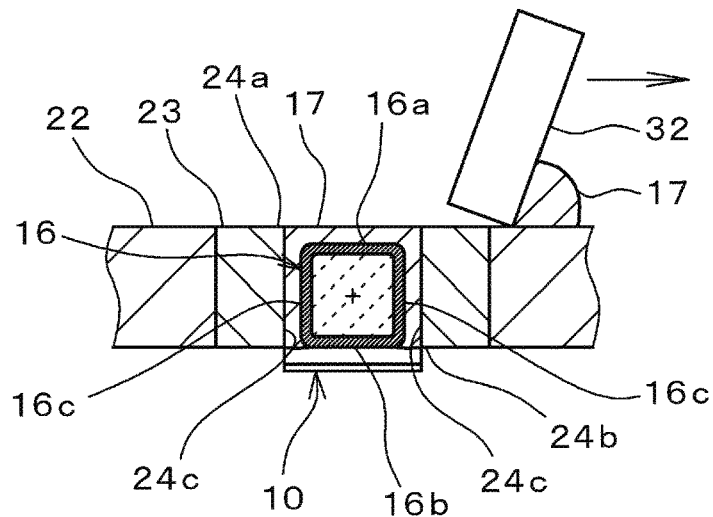

The gaps G between the inner surface 24c of the holding hole 24 and the coil 16 are filled with the supplied coating resin 17 by its own weight and capillary action as shown in FIG. 7B. Then, as shown in FIG. 7C, the coating resin 17 present above the level of the upper end 24a of the holding hole 24 is scraped with a squeegee 32.

Figure 8:
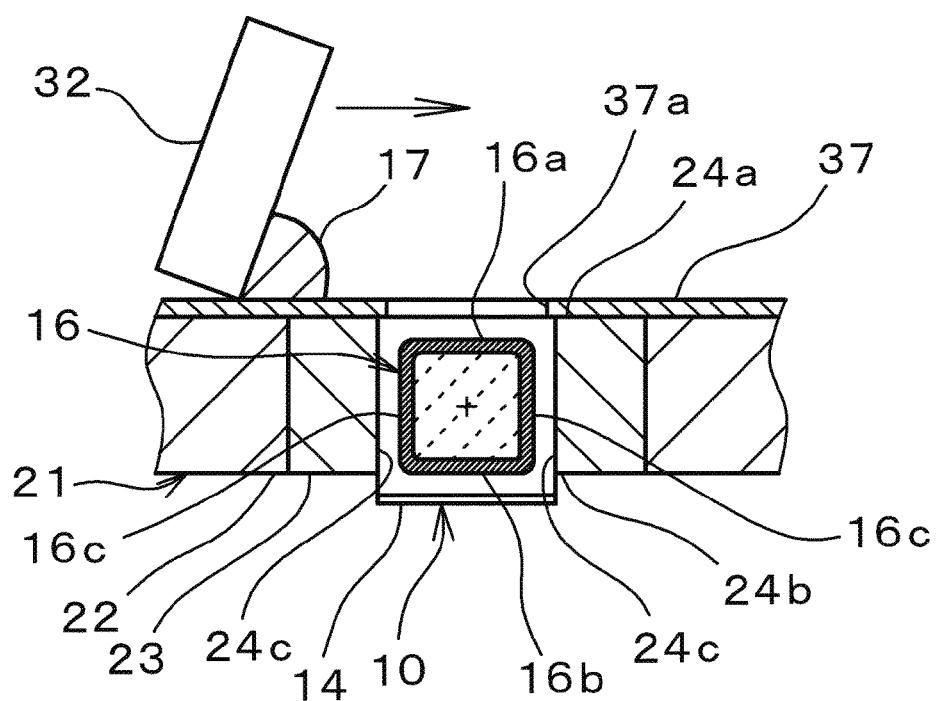
FIG. 8 is a diagram illustrating yet another method in the case of supplying a coating resin to a wound coil element.

In addition, in the case of supplying the coating resin according to the embodiment described above, it is also possible to, while a metal mask 37 with an opening 37a corresponding to the holding hole 24 is disposed so as to cover the holding jig 21, supply the coating resin 17 from the opening 37a with the use of the squeegee 32 as shown in FIG. 8.

Figure 9:
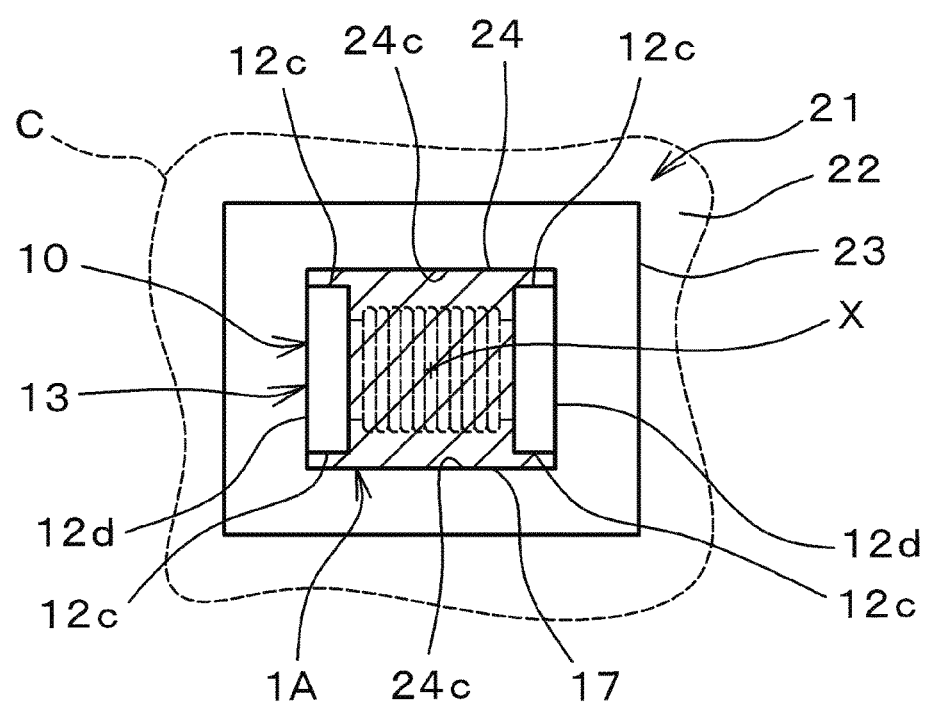
FIG. 9 is a diagram (plan view) illustrating another method for manufacturing a wound coil.

In addition, according to the present disclosure, it is also possible to form a wound coil 1A with a wound coil element 10 held, according to an embodiment as shown in FIG. 9.

More specifically, while the wound coil element 10 is held, with the use of a holding jig 21 that has a holding hole 24 for elastically holding outer end surfaces 12d of a pair of flanges 12 of a core 13, which are opposed to each other, in such a way that gaps are formed between an inner surface 24c of the holding hole 24 and side surfaces 12c of the flanges 12, a coating resin 17 is supplied into the holding hole 24, thereby making it possible to form the wound coil 1A which has a structure where not only a coil 16 but also the side surfaces 12c of the flanges 12 are coated with the coating resin 17.

Figure 10:
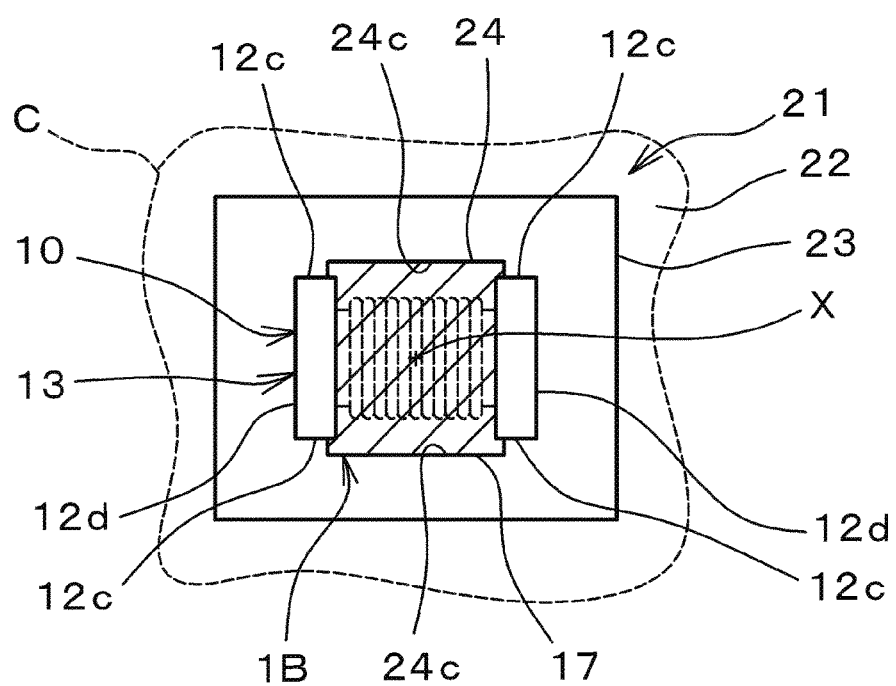
FIG. 10 is a diagram (plan view) illustrating yet another method for manufacturing a wound coil.

In addition, according to the present disclosure, it is also possible to form a wound coil 1B with a wound coil element 10 held, according to an embodiment as shown in FIG. 10.

More specifically, while the wound coil element 10 is held, with the use of, as the holding jig, a holding jig 21 that has a holding hole 24 for elastically holding outer end surfaces 12d of flanges 12 and elastically holding regions that are parts of side surfaces 12c of the flanges 12 near the outer end surfaces 12d, in such a way that gaps are formed between an inner surface 24c of the holding hole 24 and parts of the side surfaces 12c of the flanges 12, a coating resin 17 is supplied into the holding hole 24, thereby making it possible to form the wound coil 1B which has a structure where not only a coil 16 but also the parts of the side surfaces 12c of the flanges 12 are coated with the coating resin 17.

Figure 11:
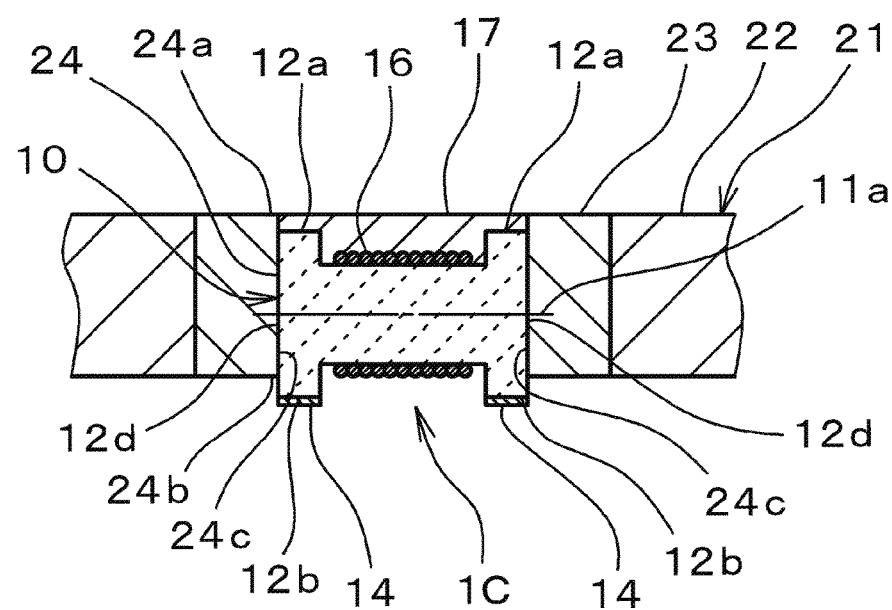
FIG. 11 is a diagram (cross-sectional view along line A2-A2) illustrating yet another method for manufacturing a wound coil.

In addition, according to the present disclosure, it is also possible to form a wound coil 1C with a wound coil element 10 held, according to an embodiment, as shown in FIG. 11.

More specifically, while the wound coil element 10 is held in a holding hole 24 in such a way that upper ends (upper surfaces) 12a of flanges 12 are lower in level than an upper end 24a of the holding hole 24, a coating resin 17 is supplied up to a position above the upper ends 12a of the flanges 12 in a step of supplying the coating resin 17, thereby making it possible to form the wound coil 1C which has a structure where an upper portion (upper end) 16a of a coil 16 is coated thickly with the coating resin 17.

It is to be noted that in the present disclosure, the attitude of the holding jig in supplying the coating resin is not limited to attitude cases where the principal surface of the jig is horizontal, whereas the axial direction of the holding hole is vertical, and the disclosure is not intended to exclude cases of supplying the coating resin, for example, in an attitude where the principal surface of the holding jig is somewhat sloped with respect to the horizontal direction (an attitude where the axial direction of the holding hole makes a certain angle with respect to the vertical direction).

In addition, the coating resin goes into gaps between the inner surface of the holding hole and the coil by capillary action, and thus, also in this respect, the attitude of the holding jig in supplying the coating resin is not limited to attitudes where the axial direction of the holding hole is vertical.

It is to be noted that while a case where the core constituting the wound coil is a coil including a winding core that is rectangular in cross-sectional shape in a direction perpendicular to the winding axis has been explained in the embodiment described above, the method for manufacturing a wound coil according to the present disclosure can also be applied to a case where the core has a winding core that is polygonal or circular in cross-sectional shape in a direction perpendicular to the winding axis.

In such a case, the shape of the inner surface of the holding hole is desirably a shape corresponding to the shape of a coil wound around the winding core that is polygonal or circular in cross-sectional shape in a direction perpendicular to the winding axis as described above.

Figure 12:
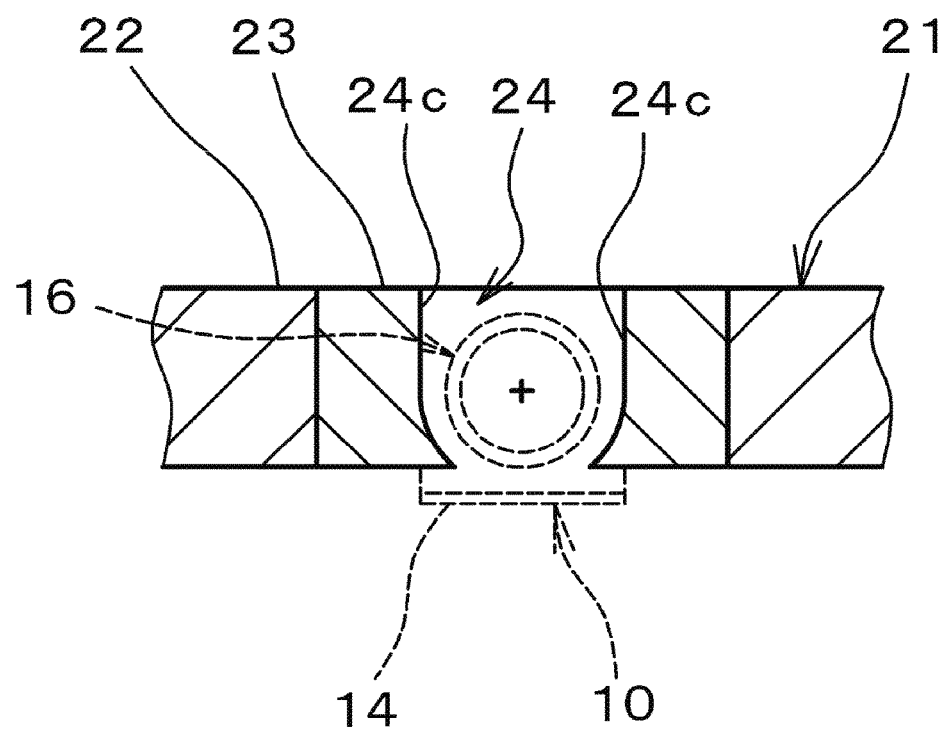
FIG. 12 is a diagram illustrating yet another method for manufacturing a wound coil, and a holding jig for use in the case of a cylindrical coil.
Figure 13:
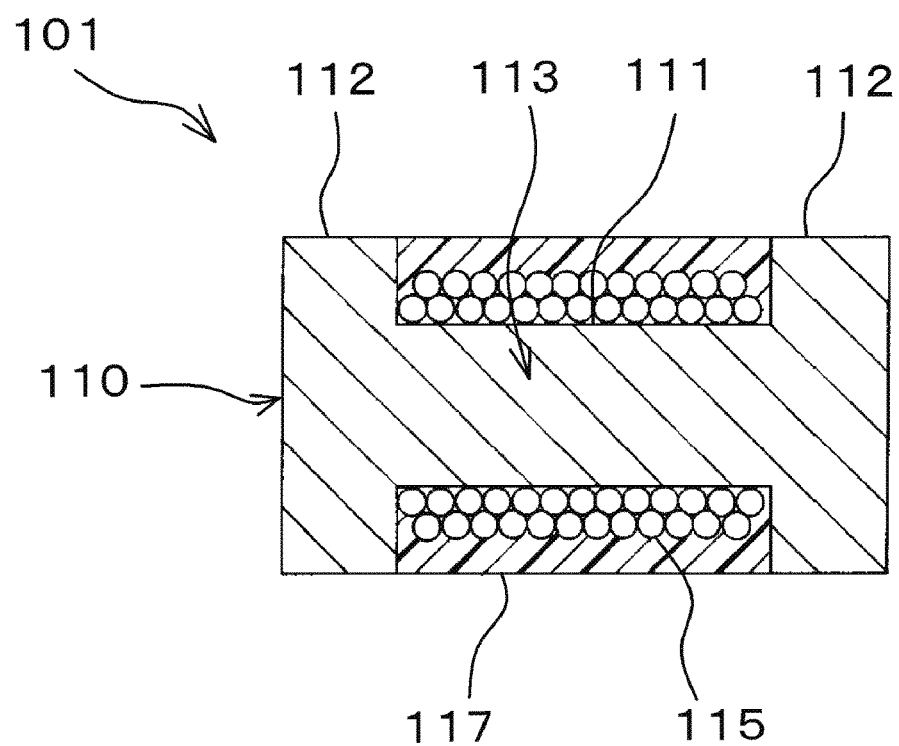
FIG. 13 is a diagram illustrating a conventional wound coil.
Figure 14:
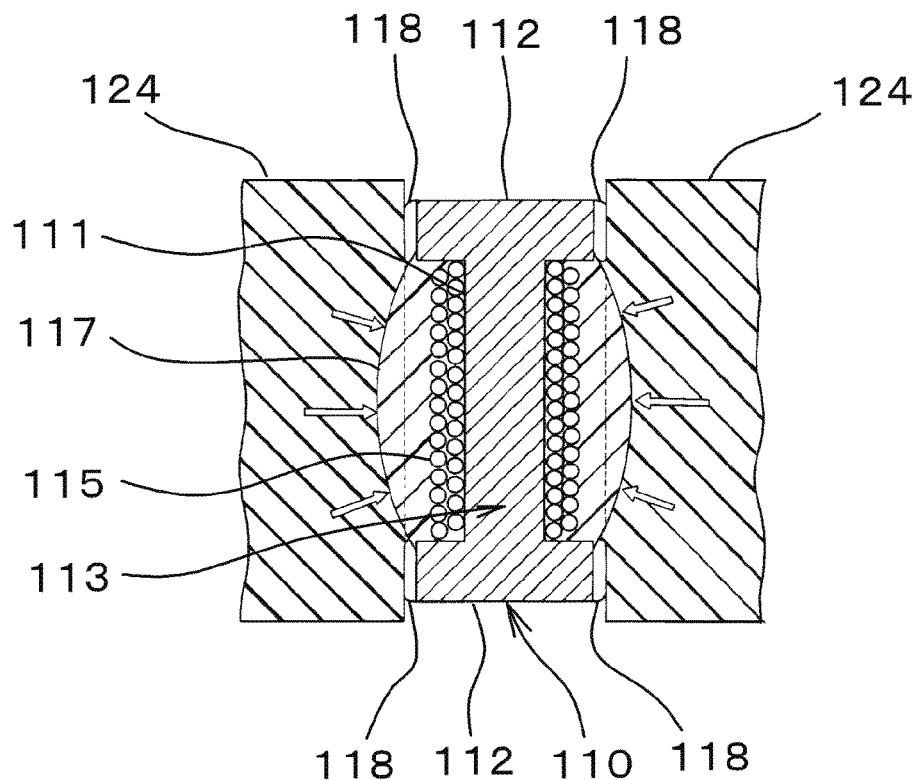
FIG. 14 is a diagram for explaining a method for manufacturing a conventional wound coil.

For example, when a cylindrical coil 16 is formed as shown in FIG. 12 by winding a wire around a winding core that is circular in cross-sectional shape, an inner surface 24c of a holding hole 24 follows the outer circumference of the coil 16, and has a predetermined gap formed between the inner surface and the outer circumference of the coil 16, while the inner surface 24c of the holding hole 24 has a partially cylindrical shape that is substantially concentric with the coil 16 with a curvature radius larger by a predetermined amount than the curvature radius of the coil 16, thereby making it possible to ensure that the outer circumference of the coil 16 is coated with a coating resin.

It is to be noted that the present disclosure is not limited to the embodiment described above in other respects, but various applications and modifications can be made within the scope of the present disclosure.

What is claimed is:

1. A method for manufacturing a wound coil, the wound coil including: a wound coil element including a core having a winding core and a pair of flanges provided at both ends of the winding core, terminal electrodes provided on the pair of flanges, and a wire wound around the winding core to constitute a coil, with a beginning and an end of the wire connected to the terminal electrodes; and a coating resin provided to bury the coil from an upper portion to both side portions of the winding core, the method comprising the steps of:

pressing the wound coil element in a holding hole of a holding jig, the holding hole having an inner surface made of an elastic material, and holding the wound coil element such that an upper end of the coil is level with or lower than an upper end of the holding hole, a lower end of the terminal electrodes is lower than a lower end of the holding hole, and a gap is present between the inner surface of the holding hole and the coil;

supplying the coating resin with fluidity into the holding hole holding the wound coil element such that the coating resin is held in the gap between the inner surface of the holding hole and the coil without causing the coating resin to flow away downwardly from the gap, and the coil is buried from the upper portion to both side portions of the winding core; and curing the supplied coating resin, with the wound coil element held in the holding jig.

2. The method for manufacturing a wound coil according to claim 1, wherein the step of supplying the coating resin includes supply the coating resin up to a level above the upper end of the holding hole, and the step of curing the supplied coating resin is carried out after removing the coating resin present above the level of the holding hole.

3. The method for manufacturing a wound coil according to claim 1, after the step of curing the coating resin, further comprising a step of removing the cured coating resin present above the upper end of the holding hole, when the cured coating resin is present above the upper end of the holding hole.

4. The method for manufacturing a wound coil according to claim 1, wherein the step of supplying the coating resin includes disposing a mask having an opening corresponding to the holding hole so as to cover the holding jig, and supplying the coating resin through the opening of the mask.

5. The method for manufacturing a wound coil according to claim 1, wherein the holding hole is rectangular in shape as viewed from an axial direction of the holding hole.

6. The method for manufacturing a wound coil according to claim 1, wherein the wound coil element is held such that a gap is provided between the inner surface of the holding hole and a side surface of each of the flanges, by using a holding jig with the holding hole for elastically holding outer end surfaces of the flanges of the core, the outer end surfaces of the flanges of the core are opposed to each other.

7. The method for manufacturing a wound coil according to claim 1, wherein the wound coil element is held such that a gap is provided between the inner surface of the holding hole and a part of a side surface of each of the flanges, by using a holding jig with the holding hole for elastically holding outer end surfaces of the flanges of the core, the outer end surfaces of the flanges of the core being opposed to each other, and elastically holding regions that are the part of the side surface of each of the flanges located near the outer end surfaces of the flanges of the core.

8. The method for manufacturing a wound coil according to claim 1, wherein the wound coil element is held in the holding hole such that upper end of the flanges are lower in level than the upper end of the holding hole, and the coating resin is supplied up to a level above the upper ends of the flanges in the step of supplying the coating resin.

* * * * *